United States Patent
Safovich et al.

(10) Patent No.: US 9,058,614 B2
(45) Date of Patent: Jun. 16, 2015

(54) SYSTEM AND METHOD FOR DYNAMICALLY CLUSTERING DATA ITEMS

(75) Inventors: Yevgeny Safovich, Bnei Brak (IL); Ronen Abramov, Petah Tiqva (IL); Natan Chosnek, Hod HaSharon (IL)

(73) Assignee: SphereUp Ltd., Tel-Aviv (IL)

( * ) Notice: Subject to any disclaimer, the term of this patent is extended or adjusted under 35 U.S.C. 154(b) by 16 days.

(21) Appl. No.: 13/476,459

(22) Filed: May 21, 2012

(65) Prior Publication Data
US 2013/0311473 A1    Nov. 21, 2013

(51) Int. Cl.
*G06F 17/30* (2006.01)
*G06Q 30/02* (2012.01)
*G06Q 10/10* (2012.01)

(52) U.S. Cl.
CPC ............... *G06Q 30/02* (2013.01); *G06Q 10/10* (2013.01)

(58) Field of Classification Search
USPC .................................. 707/737, 738
See application file for complete search history.

(56) References Cited

U.S. PATENT DOCUMENTS

| | | |
|---|---|---|
| 6,883,000 B1 | 4/2005 | Gropper |
| 7,269,590 B2 | 9/2007 | Hull et al. |
| 7,289,956 B2 | 10/2007 | Yu et al. |
| 7,360,174 B2 | 4/2008 | Grossman et al. |
| 7,483,915 B2 | 1/2009 | Thompson et al. |
| 7,505,974 B2 | 3/2009 | Gropper |
| 7,599,935 B2 | 10/2009 | La Rotonda et al. |
| 7,634,463 B1 | 12/2009 | Katragadda et al. |
| 7,707,122 B2 | 4/2010 | Hull et al. |
| 7,730,072 B2 * | 6/2010 | Richter et al. ............... 707/748 |
| 7,761,549 B2 | 7/2010 | Farnham et al. |
| 7,818,396 B2 | 10/2010 | Dolin et al. |
| 7,822,754 B2 | 10/2010 | Bhogal et al. |
| 7,917,534 B2 * | 3/2011 | Demiroski et al. ........... 707/790 |
| 7,933,587 B1 | 4/2011 | Swan |
| 2002/0049610 A1 | 4/2002 | Gropper |
| 2002/0156895 A1 | 10/2002 | Brown |

(Continued)

FOREIGN PATENT DOCUMENTS

| | | |
|---|---|---|
| KR | 100400832 B1 | 9/2003 |
| WO | 2005045591 A2 | 5/2005 |

(Continued)

OTHER PUBLICATIONS

Eghbal G. Mansoori, FRBC: A Fuzzy Rule-Based Clustering Algorithm, Oct. 2011, IEEE, 960-971.*
"Feature Extraction," from Wikipedia, the free encyclopedia, http://en.wikipedia.org/wiki/Feature_extraction, downloaded Jul. 29, 2012.
"Lament Semantic Analysis," from Wikepedia, the free encyclopedia, http://en.wikipedia.org/wiki/Latent_semantic_analysis, downloaded Jul. 29, 2012.
"Cluster Analysis," from Wikipedia, the free encyclopedia, http://en.wikipedia.org/wiki/Cluster_analysis, downloaded Jul. 29, 2012.
"Determining the number of clusters in a data set," from Wikipedia, the free encyclopedia, http://en.wikipedia.org/wiki/Determining_the_number_of_clusters_in_a_data_set, downloaded Jul. 29, 2012.

(Continued)

*Primary Examiner* — Jean B Fleurantin
(74) *Attorney, Agent, or Firm* — Pearl Cohen Zedek Latzer Baratz LLP

(57) ABSTRACT

A method for dynamically clustering data items, the method comprising: receiving a plurality of data items originating from at least two sources, a plurality of distinct metadata details, and data indicative of associations between the data items and the metadata details, wherein each data item is associated with at least one metadata detail indicative of its owner, and wherein at least a first data item originating from a first source and a second data item originating from a second source are related data items associated with at least one shared metadata detail; grading probabilities of relationships between at least one of the data items and at least one of the metadata details; clustering the data items into one or more clusters, based on the calculated probabilities; and, optionally, sharing clusters and meta-clusters between users.

18 Claims, 10 Drawing Sheets

(56) References Cited

U.S. PATENT DOCUMENTS

| | | |
|---|---|---|
| 2004/0093317 A1 | 5/2004 | Swan |
| 2004/0119760 A1 | 6/2004 | Grossman et al. |
| 2005/0049993 A1* | 3/2005 | Nori et al. ............... 707/1 |
| 2005/0091272 A1 | 4/2005 | Smith et al. |
| 2005/0120084 A1 | 6/2005 | Hu |
| 2005/0171799 A1 | 8/2005 | Hull et al. |
| 2005/0246636 A1 | 11/2005 | Blagsvedt et al. |
| 2007/0053335 A1 | 3/2007 | Onyon et al. |
| 2007/0143364 A1 | 6/2007 | Chen et al. |
| 2008/0208812 A1 | 8/2008 | Quoc et al. |
| 2008/0316925 A1 | 12/2008 | Dolin et al. |
| 2009/0106210 A1* | 4/2009 | Slezak et al. ............. 707/3 |
| 2009/0138475 A1 | 5/2009 | Caulkins |
| 2010/0153284 A1 | 6/2010 | Hoag et al. |
| 2010/0306185 A1 | 12/2010 | Smith et al. |
| 2012/0221571 A1* | 8/2012 | Orman ............... 707/737 |

FOREIGN PATENT DOCUMENTS

| | | |
|---|---|---|
| WO | 2005111849 A2 | 11/2005 |
| WO | 2006125183 A2 | 11/2006 |
| WO | 2007087106 A2 | 8/2007 |
| WO | 2010077526 A2 | 7/2010 |
| WO | 2010141216 A2 | 12/2010 |

OTHER PUBLICATIONS

"K-means clustering," from Wikipedia, the free encyclopedia, http://en.wikipedia.org/wiki/K-means_cluster, downloaded Jul. 29, 2012.

"Latent semantic analysis," from Wikipedia, the free encyclopedia, http://en.wikipedia.org/wiki/ Latent_semantic_analysis, downloaded Jul. 29, 2012.

"Rapportive," http://rappaportive.com, downloaded Jul. 29, 2012.

"Singular value decomposition," from Wikipedia, the free encyclopedia, http://en.wikipedia.org/wiki/Singular_value_decomposition, downloaded Jul. 29, 2012.

"tf*idf," from Wikipedia, the free encyclopedia, http://en.wikipedia.org/wiki/Tf-idf, downloaded Jul. 29, 2012.

"Gist by Blackberry," Social CRM, Online Contact Management, and Professional Networking, http://gist.com/, downloaded Jul. 29, 2012.

"Xobni, Your Smarter Address Book is Waiting," https://xobni.com/, downloaded Jul. 29, 2012.

* cited by examiner

SYSTEM AND METHOD FOR DYNAMICALLY CLUSTERING DATA ITEMS

FIELD OF THE PRESENTLY DISCLOSED SUBJECT MATTER

The disclosed subject matter relates to the field of data items management, and more specifically to the field of dynamic clustering and sharing of data items.

BACKGROUND

Nowadays, there are various data items associated with various computer applications. In some cases, one or more data items associated with a certain computer application can be related to other data items associated with other computer applications. In further cases, one or more data items associated with a certain computer application can conflict with other data items associated with other computer applications. Still further, in some cases, users of various computer applications can have various data items relating to other various data items of other users. There is thus a need in the art for a new system and method for dynamically clustering data items.

Prior art references considered to be relevant as background to the presently disclosed subject matter are listed below. Acknowledgement of the references herein is not to be inferred as meaning that these are in any way relevant to the patentability of the presently disclosed subject matter.

U.S. Pat. No. 7,483,915 (Thompson et al.) issued on Jan. 27, 2009 discloses a method for manipulating a plurality of discrete units of information ("Items") in a hardware/software interface system for a computer system, said method comprising interconnecting said Items with a plurality of Relationships and managing said Relationships at the hardware/software interface system level. Each Relationship constitutes, at the hardware/software interface system level, a mapping between a pair of Items that said Relationship interconnects. Moreover, each Relationship may have properties of its own, distinct and separate from the properties of the Items it interconnects.

SUMMARY

In accordance with an aspect of the presently disclosed subject matter, there is provided a method for dynamically clustering data items, the method comprising:
receiving (a) a plurality of data items originating from at least two sources; (b) a plurality of distinct metadata details; (c) data indicative of associations between the data items and the metadata details, wherein each data item is associated with at least one metadata detail indicative of its owner, and wherein at least a first data item originating from a first source and a second data item originating from a second source are related data items associated with at least one shared metadata detail;
grading strengths of relationships between at least one of the data items and at least one of the metadata details; and
clustering the data items into one or more clusters, based on the calculated strengths wherein at least one of the clusters comprises related data items originating from more than one source.

In accordance with an embodiment of the presently disclosed subject matter, there is provided a method further comprising enabling sharing of at least one of the clusters with at least one other user or public list.

In accordance with an embodiment of the presently disclosed subject matter, there is provided a method, further comprising receiving at least one additional data item relating to at least one of the clusters from the user or the public list.

In accordance with an embodiment of the presently disclosed subject matter, there is provided a method, wherein the grading comprises applying weighting functions.

In accordance with an embodiment of the presently disclosed subject matter, there is provided a method, wherein the weighting functions are rule-based weighting functions.

In accordance with an embodiment of the presently disclosed subject matter, there is provided a method wherein the clustering is based on a heuristic clustering algorithm.

In accordance with an embodiment of the presently disclosed subject matter, there is provided a method, further comprising clustering the one or more clusters into meta clusters.

In accordance with an embodiment of the presently disclosed subject matter, there is provided a method, further comprising enabling sharing of at least one of the meta clusters with at least one other user or public list.

In accordance with an embodiment of the presently disclosed subject matter, there is provided a method, further comprising ranking the clusters within the meta-clusters in accordance with the relevance of the clusters.

In accordance with an embodiment of the presently disclosed subject matter, there is provided a method, further comprising associating at least one data item with at least one additional metadata detail by utilizing information stored in a global relationships table, and wherein the grading is performed also for the at least one additional metadata detail.

In accordance with an embodiment of the presently disclosed subject matter, there is provided a method, further comprising ranking the data items within the clusters in accordance with the relevance of the data items.

In accordance with an embodiment of the presently disclosed subject matter, there is provided a method wherein the first data item is further associated with at least one metadata detail not associated with the second data item.

In accordance with an aspect of the presently disclosed subject matter, there is provided a system for dynamically clustering data items, the system comprising at least one processing unit configured to:
receive (a) a plurality of data items originating from at least two sources; (b) a plurality of distinct metadata details; (c) data indicative of associations between the data items and the metadata details, wherein each data item is associated with at least one metadata detail indicative of its owner, and wherein at least a first data item originating from a first source and a second data item originating from a second source are related data items associated with at least one shared metadata detail;
grade strengths of relationships between at least one of the data items and at least one of the metadata details; and
cluster the data items into one or more clusters, based on the calculated strengths wherein at least one of the clusters comprises related data items originating from more than one source.

In accordance with an embodiment of the presently disclosed subject matter, there is provided a system, wherein the processing unit is further configured to enable sharing of at least one of the clusters with at least one other user or public list.

In accordance with an embodiment of the presently disclosed subject matter, there is provided a system, wherein the processing unit is further configured to receive at least one additional data item relating to at least one of the clusters from the user or the public list.

In accordance with an embodiment of the presently disclosed subject matter, there is provided a system, wherein the grade comprises applying weighting functions.

In accordance with an embodiment of the presently disclosed subject matter, there is provided a system, wherein the weighting functions are rule-based weighting functions.

In accordance with an embodiment of the presently disclosed subject matter, there is provided a system, wherein the clustering is based on a heuristic clustering algorithm.

In accordance with an embodiment of the presently disclosed subject matter, there is provided a system, wherein the processing unit is further configured to cluster the one or more clusters into meta clusters.

In accordance with an embodiment of the presently disclosed subject matter, there is provided a system, wherein the processing unit is further configured to enable sharing of at least one of the meta clusters with at least one other user or public list.

In accordance with an embodiment of the presently disclosed subject matter, there is provided a system, wherein the processing unit is further configured to rank the clusters within the meta-clusters in accordance with the relevance of the clusters.

In accordance with an embodiment of the presently disclosed subject matter, there is provided a system, wherein the processing unit is further configured to associate at least one data item with at least one additional metadata detail by utilizing information stored in a global relationships table, and wherein the grade is performed also for the at least one additional metadata detail.

In accordance with an embodiment of the presently disclosed subject matter, there is provided a system, wherein the processing unit is further configured to rank the data items within the clusters in accordance with the relevance of the data items.

In accordance with an embodiment of the presently disclosed subject matter, there is provided a system, wherein the first data item is further associated with at least one metadata detail not associated with the second data item.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
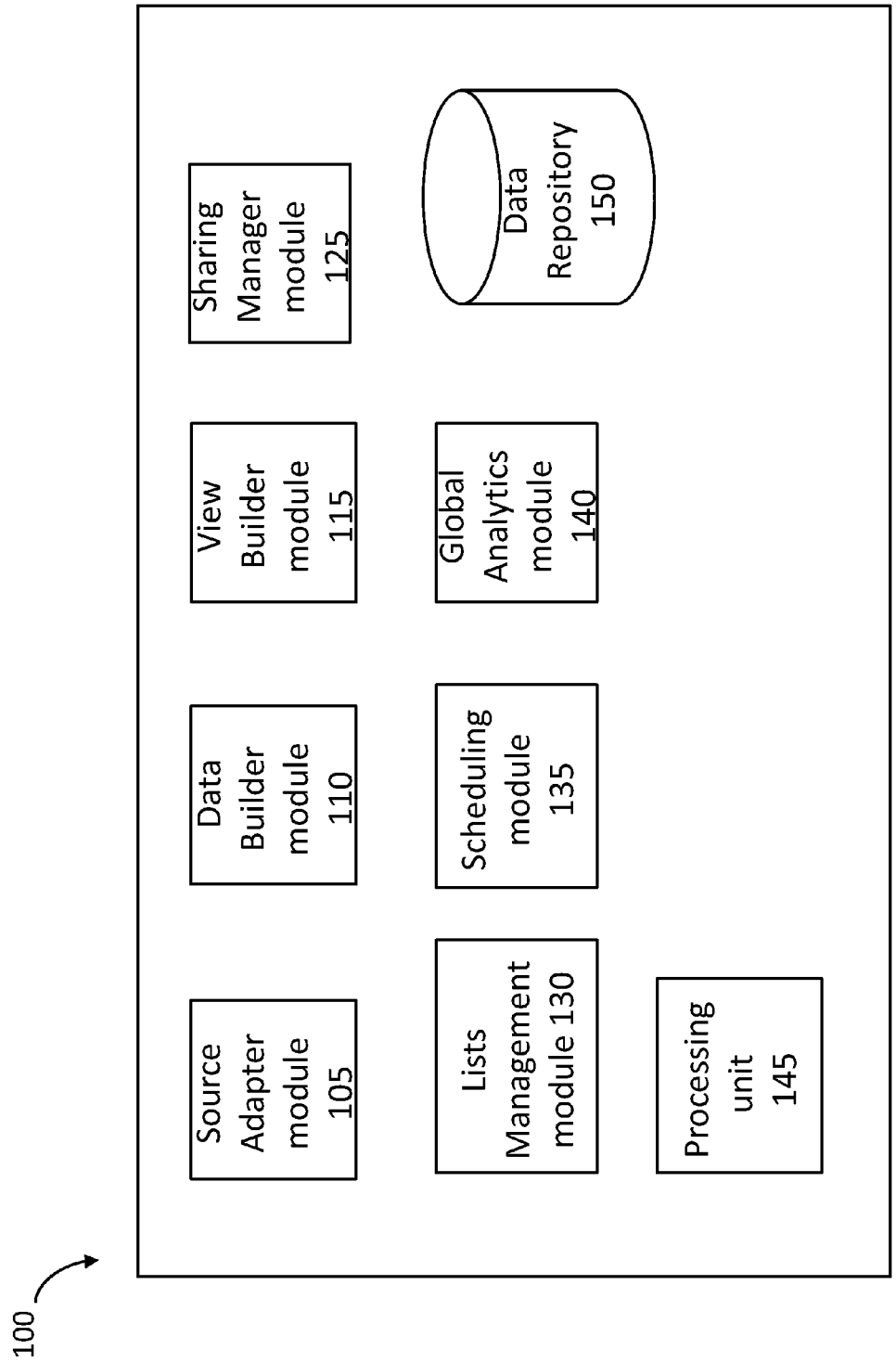
FIG. 1 is a block diagram schematically illustrating one example of a system for dynamically clustering data items, in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "grading", "clustering", "enabling", "associating", "utilizing", "ranking" or the like, include actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 2-10 may be executed. In embodiments of the presently disclosed subject matter one or more stages illustrated in FIGS. 2-10 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

In the following description, the disclosed subject matter is described with reference to personal contacts (e.g. details of people with whom a person is familiar with) comprising contact details (e.g. names, addresses, telephone and facsimile numbers, email addresses, workplaces, etc.) by way of example. It is to be noted that this is a mere non-limiting example and the disclosed subject matter is not limited to the field of personal contacts. The disclosed subject matter can be implemented in other contexts, mutatis mutandis, as can be appreciated by any person of ordinary skill in the art.

Bearing this in mind, attention is drawn to FIG. 1, showing a block diagram schematically illustrating one example of a system for dynamically clustering data items, in accordance with the presently disclosed subject matter. System 100 comprises at least one processing unit 145 (e.g. digital signal processor (DSP), a microcontroller, a field programmable gate array (FPGA), an application specific integrated circuit (ASIC), etc.) configured to receive instructions and to manage, control and execute the components and operations of system 100.

System 100 further comprises a data repository 150 for storing and enabling retrieval of various data (e.g. contact details), as further detailed below. Data repository 150 can be for example non-volatile or volatile memory, including, but not limited to, RAM, ROM, flash memory, etc.

System 100 can further comprise the following modules: source adapter module 105, data builder module 110, view builder module 115, sharing management module 125, lists management module 130, scheduling module 135 and global analytics module 140.

Figure 3:
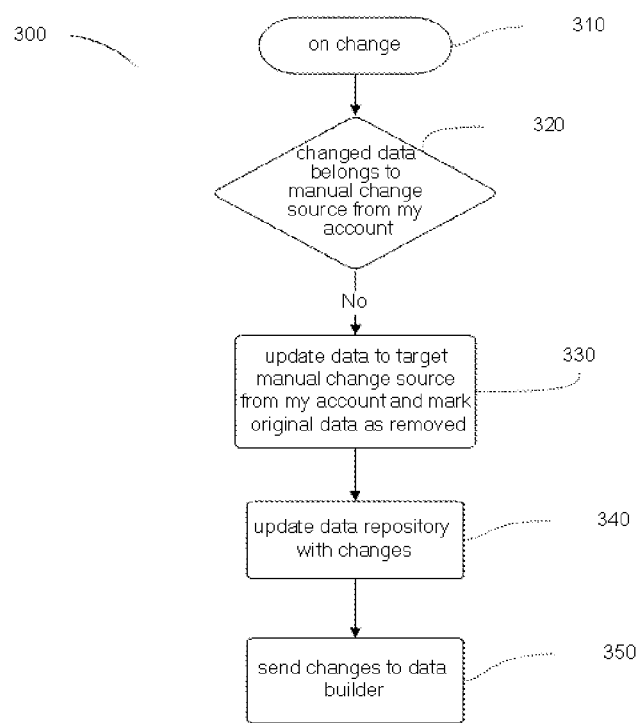
FIG. 3 is a flowchart illustrating one example of a sequence of operations carried out for receiving data items from a user manually, in accordance with the presently disclosed subject matter.
Figure 4:
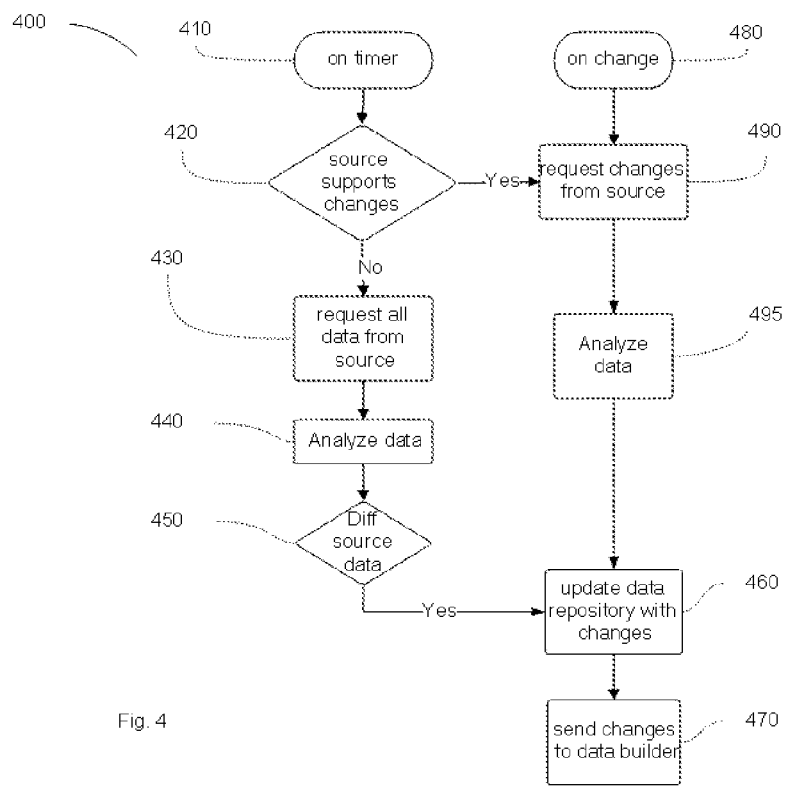
FIG. 4 is a flowchart illustrating one example of a sequence of operations carried out for receiving data items from external sources, in accordance with the presently disclosed subject matter.
Figure 5:
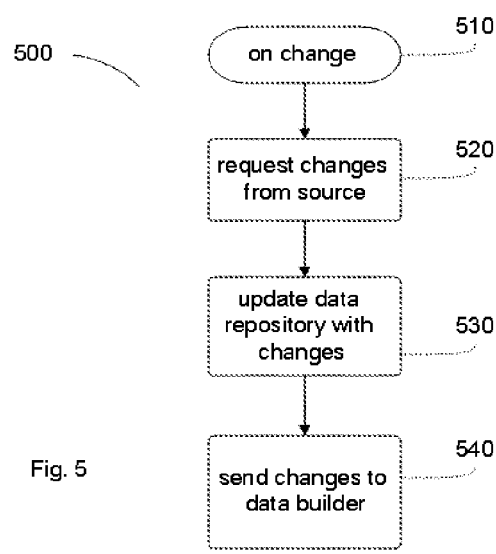
FIG. 5 is a flowchart illustrating one example of a sequence of operations carried out for receiving data items from internal sources, in accordance with the presently disclosed subject matter.

Source adapter module 105 can be configured to receive various data items (e.g. contact details) associated with a user from various sources and store the received data on data repository 150, as further detailed herein, inter alia with respect to FIGS. 3-5. In some cases source adapter module 105 can be further configured to associate various metadata items (e.g. source, type, unique ID, etc.) with the received data items (e.g. contact details), as further detailed herein.

Figure 6:
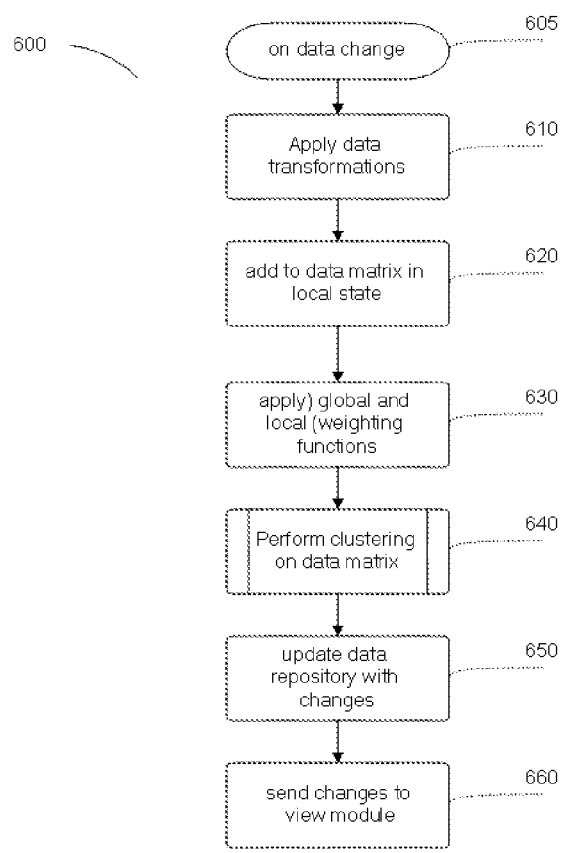
FIG. 6 is a flowchart illustrating one example of a sequence of operations carried out for clustering data items and clustering clusters into meta-clusters, in accordance with the presently disclosed subject matter.

Data builder module 110 can be configured to dynamically cluster the data items associated with a user and stored on data repository 150, e.g. into clusters (e.g. personal contacts of the user) or meta-clusters (e.g. groups of personal contacts of the user), as further detailed herein, inter alia with respect to FIG. 6.

View builder module 115 can be configured to perform various manipulations on the data created by the data builder module 110 (e.g. the created clusters or meta-clusters), enabling, inter alia, efficient consumption of the data by other modules of system 100 (e.g. global analytics module 140, etc.).

Figure 9:
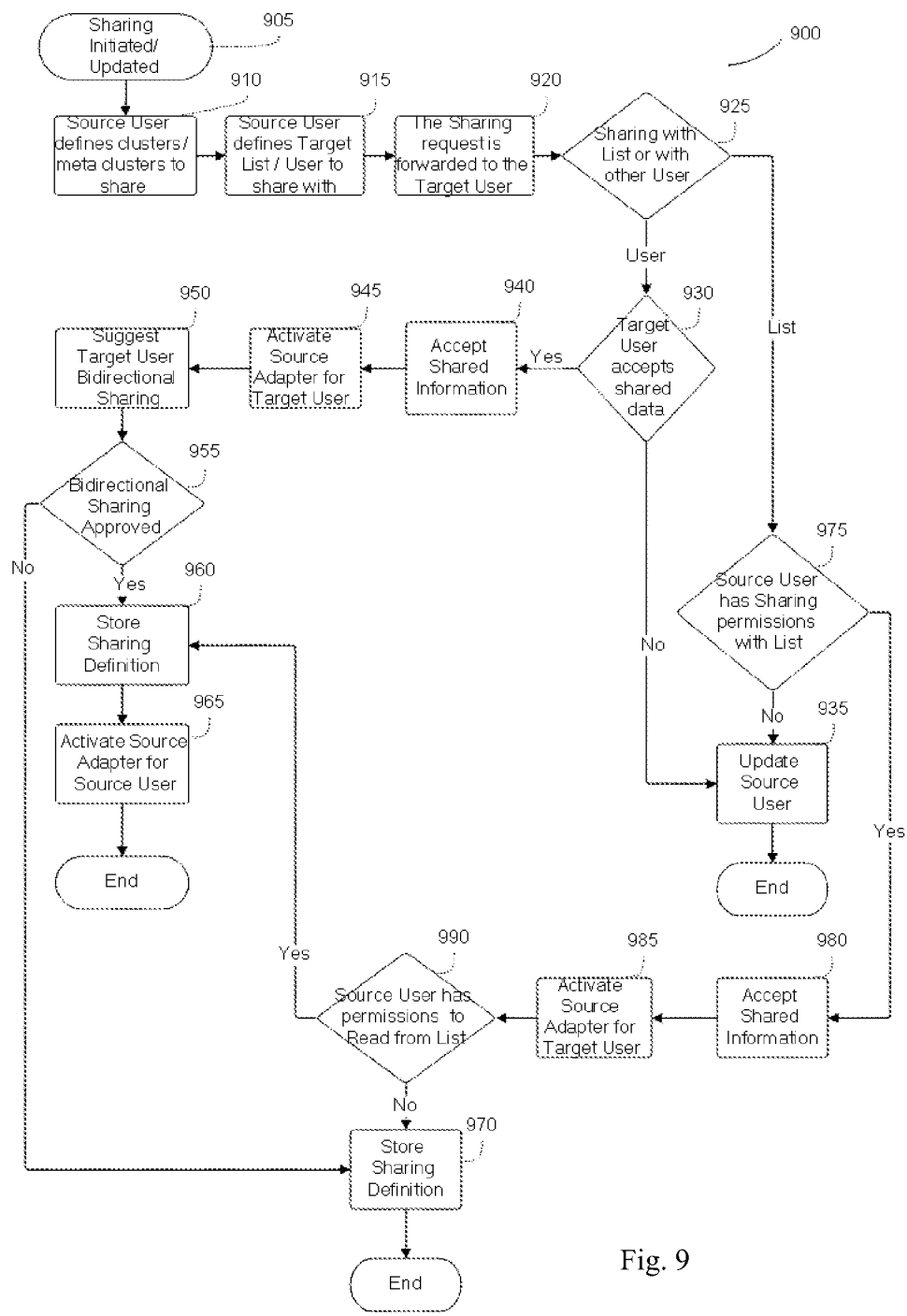
FIG. 9 is a flowchart illustrating one example of a sequence of operations carried out for sharing data between users of the system, in accordance with the presently disclosed subject matter.

Sharing management module 125 can be configured to enable a user of system 100 to share various data items (e.g. contact details), clusters (e.g. personal contacts) or meta-clusters (e.g. groups of personal contacts) with other users, as further detailed herein, inter alia with respect to FIG. 9.

Lists management module 130 can be configured to enable creation, management and sharing of lists of clusters (e.g. lists of personal contacts) between a plurality of users, as further detailed herein, inter alia with respect to FIG. 9.

Scheduling module 135 can be configured to schedule execution of various components and operations of system 100. For example, scheduling module 135 can be configured to initiate source adapter module 105 in order to retrieve various data items (e.g. contact details) from various sources, as further detailed herein, inter alia with reference to FIG. 4.

Global analytics module 140 can be configured to maintain a global relationships table (e.g. in data repository 150) containing data of relationships between the various data items (e.g. contact details) stored in data repository 150, irrespective of the owner of such data items (e.g. the person that owns the personal contact). Such data can be used inter alia by data builder module 110 while dynamically clustering the data items, as further detailed herein, inter alia with respect to FIG. 10.

It is to be noted that according to some examples of the presently disclosed subject matter, system 100 (and all or part of its modules) can be distributed over several locations and/or computers. In addition, some or all of system 100 modules can be combined and provided as a single module, or, by way of example, at least one of them can be realized in the form of two or more modules.

System 100 can further comprise a Reliable Message Bus (RMB) configured to route and transmit various messages between system 100 modules, while guaranteeing safe delivery.

Figure 2:
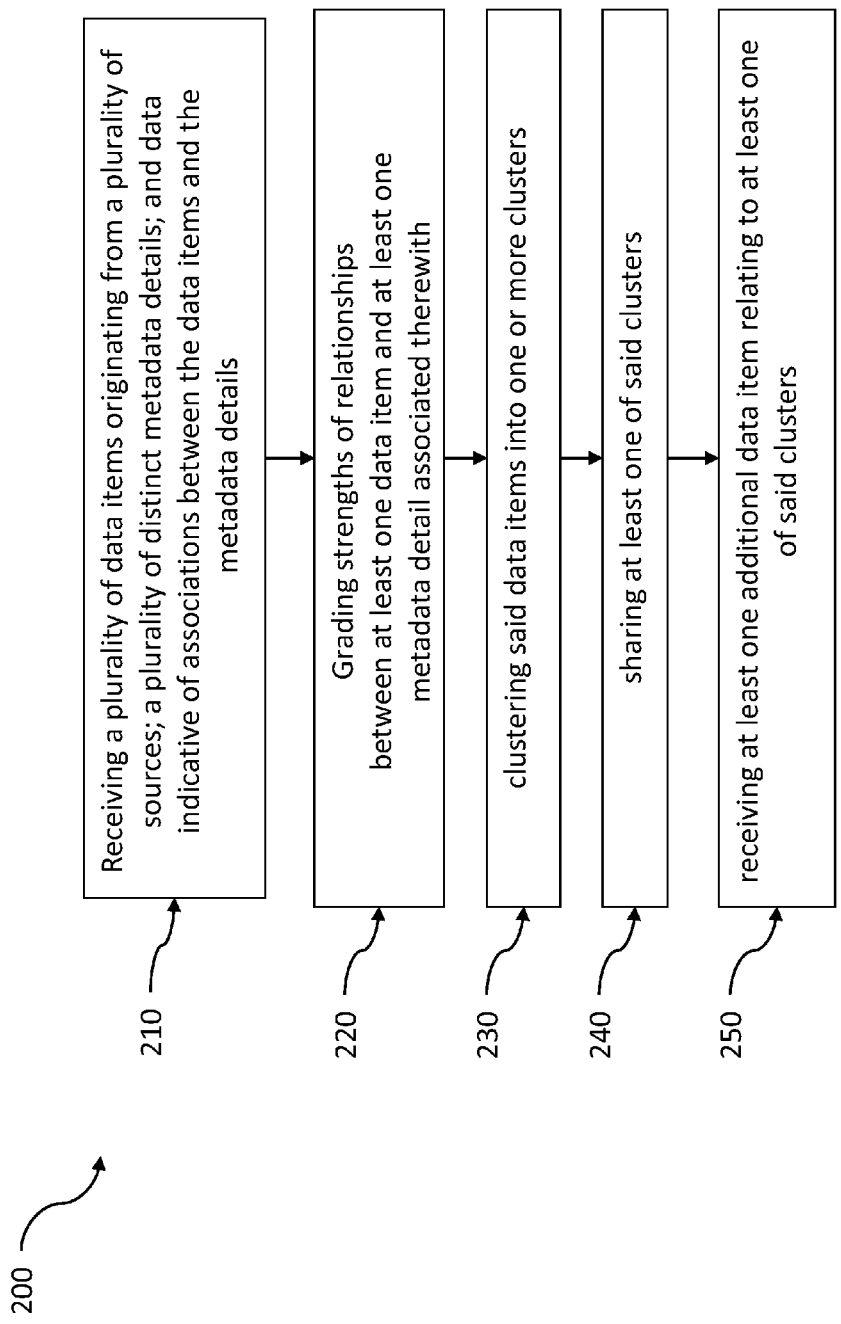
FIG. 2 is a flowchart illustrating one example of a sequence of operations carried out for dynamically clustering data items, in accordance with the presently disclosed subject matter.

Attention is now drawn to FIG. 2, showing a flowchart illustrating one example of a sequence of operations carried out for dynamically clustering data items, in accordance with the presently disclosed subject matter.

In some cases, process 200 begins by system 100 receiving: (a) a plurality of data items originating from a plurality of sources (e.g. Facebook, LinkedIn, Outlook, a cellular phone, etc.); (b) a plurality of distinct metadata details; and (c) data indicative of associations (e.g. relationships) between the data items and the metadata details (block 210). In some cases, the data can be received for example by retrieving it from data repository 150.

According to some examples of the presently disclosed subject matter, each of the data items is associated with at least one metadata detail. In some cases, at least one of the metadata details associated with each data item contains data indicative of the data item owner (the user owning the system account from which the data item was originally received into the system). In some cases, the data items can relate to personal contacts of a certain user. In some cases, the data items can be pre-stored on data repository 150 by source adapter module 105 that can receive such data items from various sources (as further detailed herein, inter alia with reference to FIGS. 3-5).

In the exemplary context of contacts, a data item can be any detail relating to personal contacts of a certain user. For example, a data item can be a first name, a surname, a middle name, an email address, an email domain, a phone number, a phone number prefix, a phone number country code, a cellular phone number, a cellular phone number prefix, a cellular phone number country code, a fax number, a fax number prefix, a fax number country code, address data items such as a street name, a house number, a country name, a house entrance, an apartment number, a workplace name, a workplace address data items, or any other detail relating to personal contacts of a certain user.

A metadata detail can be any detail that provides information about one or more data items. Thus, for example, a metadata detail can contain data indicative of a data item owner (the user to whom the data item relates), the data item source, the data item type (e.g. if it is a first name, a surname, a middle name, an email address, an email domain, etc.), the data item relation to other data items, or any other detail that provides information about a data item.

In some cases, various data items originating from various sources can be related. For example, if a certain user receives data from more than one source, it is possible that more than one source will comprise data relating to the same contact. In some cases, there can be a discrepancy between the data items relating to such a contact originating from each source. In some cases, certain data items relating to a certain contact and originating from a certain source can be identical to data items relating to such contact and originating from another source. In some cases, certain data items relating to a certain contact and originating from a certain source can be different from data items relating to such a contact and originating from another source. In some cases certain data items originating from a certain source can be missing from the other source.

Looking at an example, a certain user can have a connection to a certain contact both in Facebook and in LinkedIn; In some cases, Facebook can comprise certain information about such a contact such as a first name, a surname and an address whereas LinkedIn can comprise other information about the same contact, such as a first name, a surname and a phone number. It can be appreciated that there are shared data items, namely the first name and the last name, and distinct data items such as the address and the phone number, whereas all of the data items relate to the same contact.

In some cases, at least one data item originating from a certain source and at least one data item originating from another source can be related data items. Such related data items can be associated with at least one shared metadata detail and one of such related data items can be associated with at least one metadata detail that is not associated with the other data item. As indicated above, a metadata detail can be indicative of a data item relation to other data items. In some cases, each data item (e.g. the first name, the surname, the address, the phone number or any other data item) can be associated with metadata details indicative of its relation to other data items. Looking at the example above, the data item representing the first name of the contact from Facebook can be associated with the metadata detail comprising the contact's surname, and with the metadata detail comprising the contact's address, whereas the data item representing the first name of the contact (relating to the same contact) from LinkedIn can be associated with the metadata detail comprising the contact's surname, and with the metadata detail comprising the contact's phone number. It can be appreciated that both data items are associated with the metadata detail comprising the contact's surname, and that each data item is also associated with an additional metadata detail that the other data item is not associated with.

In some cases, system 100 can be further configured to grade the strengths of relationships between at least one of the data items and at least one metadata detail associated therewith (block 220), e.g. by utilizing data builder module 110 (as further detailed herein, inter alia with reference to FIG. 6).

According to some examples of the presently disclosed subject matter, system 100 can be still further configured to cluster the data items into one or more clusters (block 230), in accordance with the calculated strengths, e.g. by utilizing data builder module 110 (as further detailed herein, inter alia with reference to FIG. 6). In some cases, a cluster can comprise one or more data items relating to a specific personal contact (e.g. the personal contact first name and/or middle name and/or surname and/or email address and/or phone number and/or any other detail relating to the personal contact).

In some cases, system 100 can be further configured to cluster one or more of the clusters (in the context of personal contact—the personal contacts) into meta-clusters. A meta-cluster in the context of personal contact is a group of personal contacts, e.g. a group of personal contacts relating to a certain user. It is to be noted that the relation of the group of personal contacts comprising the meta-cluster to such a user can be a meaningful relation for such a user (e.g. co-workers of the user, friends of the user, family of the user, etc.).

In some cases, system 100 can be further configured to utilize view builder module 115 in order to perform various manipulations on the data created by the data builder module 110 (e.g. the created clusters or meta-clusters), enabling, inter alia, efficient consumption of the data by other modules of system 100 (e.g. global analytics module 140, etc.).

According to some examples of the presently disclosed subject matter, system 100 can be configured to enable a user to share various data items (e.g. contact details), clusters (e.g. personal contacts) or meta-clusters (e.g. groups of personal contacts) with other users (block 240), for example by utilizing sharing management module 125, as further detailed herein, inter alia with respect to FIG. 9. Thus, in some cases, a user can give various types of access permissions (e.g. read, write, etc.) on its data items and/or clusters and/or meta-clusters to one or more other users of system 100. Assuming, as an example, that a certain user (hereinafter: "User A") has contact details of a certain person (hereinafter: "person A"), and that he is interested in sharing all or part of the contact details with another user (hereinafter: "User B") of system 100. System 100 can enable the User A to give User B access to all or part of the contact details relating to person A that User A has, thus enabling User B to introduce the contact details of person A (or parts thereof, in case user B already has part of the contact details of person A) to his personal contacts.

In some cases, system 100 can be further configured to receive at least one additional data item (e.g. a contact detail), cluster (e.g. a personal contact) or meta-cluster (e.g. a group of personal contacts) from other users that chose to share such data items with the user (block 250), for example by utilizing sharing management module 125, as further detailed herein, inter alia with respect to FIG. 9. Thus, in some cases, a user can receive various types of access permissions (e.g. read, write, etc.) to data items and/or clusters and/or meta-clusters relating to one or more other users of system 100. Receipt of such access permissions can enable the user to introduce the received contact details and/or clusters and/or meta-clusters (or parts thereof, in case he already has part of the received contact details and/or clusters and/or meta-clusters) to his personal contacts.

It is to be noted, with reference to FIG. 2, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Turning to FIG. 3, there is shown a flowchart illustrating one example of a sequence of operations carried out for receiving data items from a user manually, in accordance with the presently disclosed subject matter. As indicated above, the data items that are received by system 100 can be received from various sources, e.g. by utilizing source adapter module 105 that can be configured, inter alia, to store the received data items (and/or derivatives thereof) in data repository 150.

One exemplary source is manual user input. It can be appreciated that system 100 contains (e.g. in data repository 150) various data items relating to personal contacts of various users, and can enable users (for example using a user interface) to insert new data items and/or clusters and/or meta-clusters, and to update and delete existing data items and/or clusters and/or meta-clusters.

According to some examples of the presently disclosed subject matter, process 300 (performed, for example, by utilizing source adapter module 105) can begin upon detection of one or more changes (e.g. insert and/or update and/or delete of data items and/or clusters and/or meta-clusters) originating from a certain user (block 310). System 100 can be configured to check if the detected changes relate to data items that were manually introduced into the system 100 by the user (block 320). It is to be noted that an indication about the source of the data items can be provided as part of the metadata associated therewith.

In case the changes do not relate to data items that were manually introduced into the system 100 by the user (e.g. in case the data items originate from an external source, as further detailed herein, inter alia with reference to FIG. 4), system 100 can be configured to mark any data item that is to be updated or deleted as a removed data item prior to introducing the changes (block 330). If, however, the changes do relate to data items that were manually introduced into the system 100 by the user, or following marking of the data items as indicated above, system 100 can be further configured to introduce the changed data to data repository 150 (block 340). In some cases, system 100 can be further configured to activate data builder module 110 (block 350), in order to cluster the updated data items relating to a certain user (e.g. the user that is logged in to the system 100) into clusters and/or meta clusters, as further detailed herein, inter alia with reference to FIG. 6.

It is to be noted, with reference to FIG. 3, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

FIG. 4 is a flowchart illustrating one example of a sequence of operations carried out for receiving data items from external sources, in accordance with the presently disclosed subject matter.

System 100 can receive various data items from various external sources (external to system 100). For example, system 100 can be configured to utilize various Application Programming Interfaces (API's) of various external sources in order to retrieve various data items relating to a certain user (e.g. the user that is logged in to the system 100). Such external sources can include, for example, Facebook, LinkedIn, Google's Gmail, Microsoft's Active Directory or any other external source. System 100 can be configured to retrieve various data items also from other applications such as Microsoft's Outlook, an organizational database, or any other sources, including sources that do not provide an API. System 100 can be still further configured to retrieve data from various storage formats and file types such as XML, Excel files, CSV files, RSS and REST web feeds, etc.

In some cases, process 400 (performed, for example, by utilizing source adapter module 105) can be triggered every pre-determined time interval (block 410), for example as determined by scheduling module 135. In such cases, system 100 can be configured to check if the external source enables retrieval of updates made to data items (e.g. new data items, updated data items, deleted data items) since the last retrieval of data therefrom (block 420). In case not, system can be configured to retrieve all of the data items relating to a certain user (e.g. the user that is logged in to the system 100) (block 430).

Following retrieval of the data items, system 100 can be configured to associate each of the data items with various metadata relating thereto, and in some cases also to perform various manipulations on the received data items (block 440).

In some cases, such manipulations of the received data items can include applying various rules used inter alia for stemming and/or augmenting and/or modifying and/or performing any other manipulation on the received data items. In some cases, to such manipulations of a data item can result in dividing the retrieved data items into multiple data items. In some cases, each of the newly created data items is associated with metadata details containing the data of each of the other newly created data items. Thus, for example, in case a certain retrieved data item contains more than one detail of a personal contact, such data item can be divided into two (or more if required) data items, each containing a certain detail of a personal contact. In some cases, each of the created data items can be associated with metadata details containing the data of the other data items. In an exemplary manner, in case a certain retrieved data item contains both a first name and a surname, system 100 can manipulate the retrieved data item and create two separate data items—one indicative of the first name, and the other indicative of the surname (it is to be noted that this is a non limiting example and other manipulations can be additionally or alternatively performed). In addition, in the above example, the data item indicative of the surname will be associated at least with a metadata detail indicative of the first name and the data item indicative of the first name will be associated at least with a metadata detail indicative of the surname.

As indicated above, in some cases system 100 can be further configured to associate each data item with one or more of the following: metadata indicative of the data item owner (e.g. the user that is logged in to the system), metadata indicative of the source from which the data item originated (e.g. the external source from which the data item was retrieved), a unique identifier relating to the data item (for enabling unique identification thereof), etc.

In addition, system 100 can be configured to associate one or more of the data items with metadata indicative of various relationships between two or more data items. It can be appreciated that when data items are retrieved from a certain external source, or following manipulation of the retrieved data items (as detailed above), some of the data items can be related. Thus, for example, a certain data item can contain a first name of a certain personal contact and another data item can contain a surname of the same personal contact. In this exemplary scenario, system 100 can be configured to associate each data item with metadata indicative of such relation. Such metadata indication can be provided by associating the relevant data items with metadata indicative of a relationship unique identifier or metadata containing a certain text string that can be later used by system 100 in order to identify the relationship.

In some cases, such metadata can include various hints indicative of a relationship (not necessarily uniquely identifying the relationships). In such cases, such metadata can be used in order to cluster the data items, as further detailed herein.

Still further, system 100 can be configured to associate one or more of the data items with metadata indicative of a calculated pre-rank associated with the data item. A pre-rank can be calculated according to various pre-determined rules. For example, in case the data items are retrieved from an external source such as Facebook, such data items can represent personal contact details of friends of the user that is logged in to system 100 (hereinafter: "First Circle Friends"), or data items of friends of friends (and so forth, hereinafter: "Outer Circles Friends"). A higher pre-rank can be calculated to the First Circle Friends in comparison to Outer Circle Friends. It is to be noted that this is a mere example of a pre-rank that can be calculated for a data item, and other pre-rank calculations can be performed.

According to some examples of the presently disclosed subject matter, system 100 can be further configured to compare the received data items with the data stored on data repository 150 (in some cases, prior to such comparison, the system can flush any local data that is not up to date in data repository 150) (block 450).

In case there is a difference between the retrieved data items and the data items stored on data repository 150, system 100 can be further configured to update data repository 150 (block 460) and activate data builder module 110 (block 470), in order to cluster the updated data items relating to a certain user (e.g. the user that is logged in to the system 100) into clusters and/or meta clusters, as further detailed herein, inter alia with reference to FIG. 6.

In some cases, process 400 can be triggered upon detection of a change of one or more data items stored in the external source and relating to a certain user (e.g. the user that is logged in to the system 100) (block 480). It is to be noted that the ability to detect a change in data items stored in an external source depends on the external source's ability to communicate updates upon its initiative. In such cases, system 100 can be configured to retrieve the changed data items (in case the change included updating data items and/or inserting new data items) or an indication of the change in the data items (in case of deleting existing data items) (block 490).

In some cases (e.g. if there are updated data items and/or new data items), system 100 can be configured to perform various manipulations on the received data items and/or to associate each of the data items with various metadata relating thereto, as detailed above with respect to block 440 (block 495).

System 100 can be further configured to update data repository 150 (block 460) and activate data builder module 110 (block 470), in order to cluster the updated data items relating to a certain user (e.g. the user that is logged in to the system 100) into clusters and/or meta clusters, as further detailed herein, inter alia with reference to FIG. 6.

It is to be noted, with reference to FIG. 4, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Turning to FIG. 5, there is shown a flowchart illustrating one example of a sequence of operations carried out for receiving data items from internal sources, in accordance with the presently disclosed subject matter.

As detailed herein, various data items and/or metadata associated therewith relating to a certain user (e.g. the user that is logged in to the system 100), and stored in data repository 150, can be updated, for example as a result of manual user input, data received from external sources, etc. In some cases, as indicated herein, a user can share one or more data items and/or clusters and/or meta clusters with one or more other users.

In some cases, where one or more data items (and/or metadata associated therewith) that are shared by a certain user (that chose to share such data with one or more other users) is updated, system 100 can be configured to trigger process 500 thereby enabling updating the respective data items of the one or more other users that received such data from such a user.

Process 500 (performed, for example, by utilizing source adapter module 105) can be triggered upon detection of a change in one or more data items (and/or metadata associated therewith) that have been shared with a certain user (e.g. the user that is logged in to the system 100) (block 510). Following detection of such a change, system 100 can be configured to retrieve the changed data items and/or metadata associated therewith (in case the change included updating data items and/or metadata associated therewith and/or inserting new data items and/or metadata associated therewith) or an indication of the change in the data items and/or metadata associated therewith (in case of deleting existing data items and/or metadata associated therewith) (block 520), update the data repository 150 accordingly (block 530) and activate data builder module 110 (block 540), in order to cluster the updated data items relating to a certain user (e.g. the user that is logged in to the system 100) into clusters and/or meta clusters, as further detailed herein, inter alia with reference to FIG. 6.

It is to be noted, with reference to FIG. 5, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Attention is now drawn to FIG. 6, showing a flowchart illustrating one example of a sequence of operations carried out for clustering data items and clustering clusters into metaclusters, in accordance with the presently disclosed subject matter.

In some cases, system 100 can be configured to perform a clustering process 600 (for that purpose, system 100 can utilize data builder module 110 for example). The clustering process 600 can be dynamic and can be initiated whenever there is a change in the data items and/or the metadata associated therewith (e.g. a new data item and/or metadata associated therewith is introduced, a data item and/or metadata associated therewith is updated, a data item and/or metadata associated therewith is deleted) (block 605).

In some cases, following such a change, system 100 can optionally be configured to perform various manipulations on new or updated data items and/or to associate each of the new or updated data items with various metadata relating thereto (block 610). In some cases, such manipulations can be different than, and can be performed in addition to, the manipulations performed when receiving data items from external sources as detailed with respect to FIG. 4.

In some cases, such manipulations of the new or updated data items can include applying various rules used inter alia for stemming and/or augmenting and/or modifying and/or performing any other manipulation on the new or updated data items. In some to cases, such manipulations of a data item can result in dividing the new or updated data items into multiple data items. Thus, for example, in case a certain new or updated data item contains more than one detail of a personal contact, such a data item can be divided into two (or more if required) data items, each containing a certain detail of a personal contact. In an exemplary manner, in case a certain new or updated data item contains both a first name and a surname, system 100 can manipulate the new or updated data item and create two separate data items—one indicative of the first name, and the other indicative of the surname (it is to be noted that this is a non limiting example and other manipulations can be additionally or alternatively performed).

System 100 can be further configured to maintain a data matrix containing data indicative of the strength of a relationship between the various data items relating to a certain user (e.g. the user that is logged in to the system 100) and the various metadata details associated therewith.

It is to be noted that each data item (irrespective of its content) can be represented as a row in the data matrix, even if more than one data item has identical content. Therefore, there is a need in associating each data item with a data item identifier (ID) as more than one data item can have the same content (e.g. a certain user can have two contacts named "Joe", and thus, two data items with the content "Joe" will exist, for example). In some cases, the metadata items are represented distinctively in the data matrix. Therefore, in such cases, even if more than one data item is associated with a certain metadata detail, such a metadata detail will be represented as a single column in the data matrix (e.g. if more than one data item is associated with a metadata detail containing a value such as "Facebook", only one column with such value will be presented into the data matrix).

Although in the description above it is indicated that data items are represented by rows of the data matrix and metadata details are represented by columns of the data matrix, it can be appreciated that, as an alternative, data items can be represented by columns of the data matrix and metadata details can be represented by rows of the data matrix.

In some cases, each cell relating to a data item and to a metadata detail associated therewith can be assigned with a certain numeric value, e.g. one, whereas each metadata detail that is not associated to such data item can have another numeric value, e.g. zero. It is to be noted that, other numeric values can be used. In some cases the cells can have a default cell value, that can be changed in some cases, as further detailed below, e.g. with respect to FIG. 7. In further cases, although in the example shown in the description, reference is made to numeric values, non-numeric values can be used mutatis mutandis.

In some cases, system 100 can be configured to update such data matrix in accordance with the change in the data items or the metadata details associated therewith, e.g. by adding or deleting rows and columns as required and/or by updating the respective cells values (block 620).

System 100 can be configured to apply various weighting functions, including known in the art weighting functions, in order to calculate the strength of a relationship between the various data items and the various metadata details (block 630). Such weighting functions can be, for example, rule-based weighting functions. The rules can be, for example, based on the data items source, type, value, owner, etc. and/or based on the metadata items. Thus, for example, a certain rule can determine that each data item that was received from a certain source a certain source is more (or less) reliable than data items that were received from other sources. In such cases, the value within the call that is associated with each data item that is associated with a metadata detail indicative of such source can be multiplied (or divided) by a certain number (e.g. 10, etc.). Another rule can determine that a data item that is comprised of a phone number with an area code should have a higher (or lower) weight than a phone number without an area code. Thus, the value of each call associated with a data item indicative of a phone number with an area code can be multiplied (or divided) by a certain number (e.g. 2, etc.). Another rule can be based on the type of the metadata detail. For example, if the metadata detail is derived from a certain comment relating to a certain data item (e.g. a comment on a certain contact in Facebook), a certain rule can determine that the value of each cell associated with such metadata detail should be lower than the value of cells that are associated with metadata details that indicate that the origin of the data items is Facebook, and thus, the value of such cells is divided by a certain number (e.g. 100). Another exemplary rule can determine that any metadata detail indicative of relationship information provided by a user should have a high weight indicative of a very high strength of a relationship (as further detailed below, with respect to FIG. 7).

System 100 can be further configured to operate additional weighting functions in order to calculate the strength of a relationship between the various data items and the various metadata details. Thus, for example, certain weighting functions can add weights to metadata details that appear rarely (e.g. specific surnames). Certain weighting functions can reduce weights of metadata details that appear frequently (e.g. a certain area code). In some cases, for that purpose, known techniques such as inversed document frequency and other known in the art functions, like entropy, can be used.

It is to be noted that these are mere examples and other weighting functions can be used in order to calculate the strength of a relationship between the various data items and the various metadata details.

System 100 can be further configured to group the data items into clusters while utilizing the data within the data matrix (block 640). For this purpose, system 100 can use known in the art dimensionality reduction techniques such as feature extraction techniques (e.g. Latent Semantic Analysis—LSA, Singular Value Decomposition—SVD, Locality-sensitive hashing—LSH, Random Projection, etc.) in order to reduce the size of the data matrix while preserving data that will allow to cluster data items in a meaningful manner (so that the resulting clusters will have meaning to the user, e.g. so that each cluster will represent a contact person of such user, when speaking of personal contacts). Subsequently system 100 can be configured to employ a heuristic clustering algorithm known in the art (such as Hierarchical clustering, Bi-clustering, k-means clustering, etc.) to produce clusters (in the example of personal contacts, each cluster can represent a personal contact) based on the reduced matrix.

Looking for an example on k-means clustering, the number of clusters ("k") is first determined. The number of clusters can be determined randomly (by trial and error), or according to a formula (e.g. a division by two of the square root of the number of data items), or (in case of personal contacts) a sum of the number of contacts that were received from every source, or in any other manner.

Each cell within the reduced matrix represents the strength of a relationship between its respective data item and metadata detail. Thus, in every column (or row, depending on the selected representation in the data matrix) representing a data item, there will be a list of weights representing the strength of a relationship between it and the metadata details. Such a list of weights can be represented by a coordinate in an n-dimensional space. Each of the "k" clusters can be assigned with a coordinate of a random data item, and thus the clusters can be distributed over the n-dimensional space. In addition, each data item can also be represented by a coordinate in the n-dimensional space.

Once the clusters and the data items are represented in the n-dimensional space, each data item can be assigned to the cluster to which it is closest in the n-dimensional space, thus giving rise to the clusters.

Figure 8:
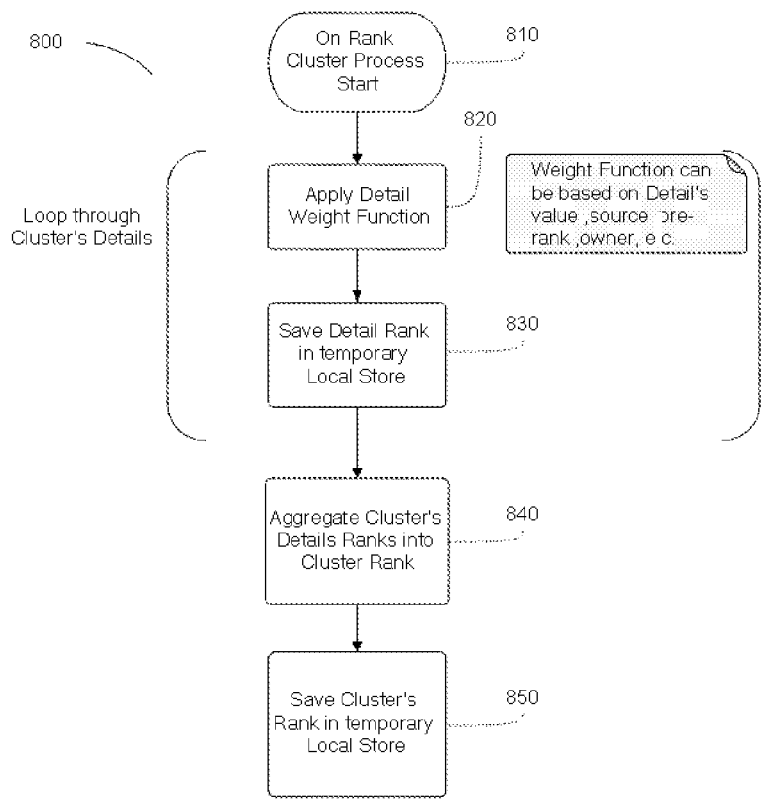
FIG. 8 is a flowchart illustrating one example of a sequence of operations carried out for ranking data items and clusters, in accordance with the presently disclosed subject matter.

In some cases, system 100 can be still further configured to perform a ranking process for ranking data items within each cluster, and/or for ranking each cluster within a meta cluster (block 650), as further detailed herein, with reference to FIG. 8.

System 100 can be configured to update data repository 150 with the resulting clusters and ranks (block 660).

It is to be noted that the process detailed above can be activated, mutatis mutandis, in order to cluster the created clusters into meta clusters. In such a case, for example, instead of creating the data matrix by using the data items, the data matrix rows can represent the created clusters (e.g. each cluster will be represented by a row in the data matrix, for example according to cluster identifications (ID's)) whereas the data matrix columns can represent the metadata details associated with the cluster. In some cases, the metadata details can be similar to the metadata details that are associated with the data items comprising such clusters.

Thus, the data matrix will contain data indicative of the strength of a relationship between the various clusters relating to a certain user (e.g. the user that is logged in to the system 100) and the various metadata details associated therewith (e.g. the various metadata details associated with the data items that the clusters comprise).

The process detailed above can be implemented on the data matrix in order to cluster the clusters into meta clusters, mutatis mutandis.

It is to be noted, with reference to FIG. 6, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 7:
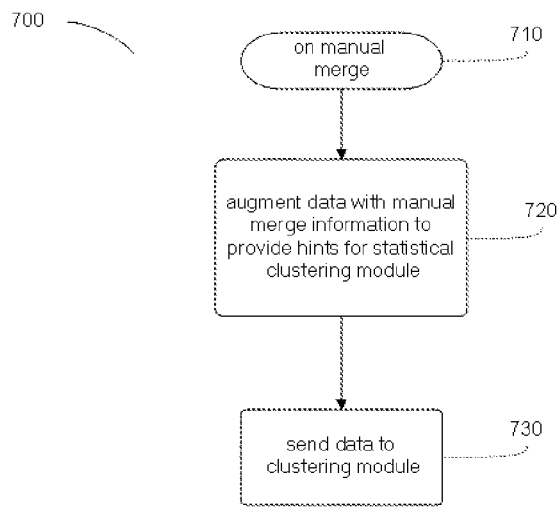
FIG. 7 is a flowchart illustrating one example of a sequence of operations carried out for enabling a user to manually determine a relationship between two or more data items, between a certain data item and a certain cluster, or between a certain cluster and a certain meta cluster, in accordance with the presently disclosed subject matter.

Attention is now drawn to FIG. 7, showing a flowchart illustrating one example of a sequence of operations carried out for enabling a user to manually determine a relationship between two or more data items, between a certain data item and a certain cluster, or between a certain cluster and a certain meta cluster, in accordance with the presently disclosed subject matter.

In some cases, system 100 (e.g. by utilizing data builder module 110) can enable a user to add relationship information indicative of a relationship (or, in some cases, lack thereof) between two or more data items, between a certain data item and a certain cluster, or between a certain cluster and a certain meta cluster (block 710). In some cases, system 100 can provide a user with a user interface enabling addition of such information. Upon introduction of such information, system 100 can be configured to associate each data item, cluster, or meta cluster, to which such relationship information relates, with metadata details indicative of the relationship (or lack thereof) in accordance with the relationship information (block 720). Thus, for example, in case a certain user is aware of a relationship (or lack thereof) between two or more data items, he can provide information indicative of the relationship (or lack thereof), and system 100 can be configured to associate each of the related data items with a metadata detail indicative of such relationship (or lack thereof).

In some cases, during the clustering process 600 execution, the cell relating to a data item and to a metadata detail associated therewith and indicative of relationship information provided by a user, can be assigned with a relatively high (or low, e.g. in case of lack of relationship) numeric value (e.g., in case the relationship information is indicative of a relationship, a higher numeric value in comparison to a default numeric value assigned to other cells) indicative of a high strength of a relationship. Such assignment can be performed for example during execution of the process described with reference to block 620 herein. In some cases, when non-numeric cell values are used, other representations indicative of a higher weight (or lower weight in case of lack of relationship) indicative of a high strength of a relationship to assign to cells can be used. Alternatively, the cell relating to a data item and to a metadata detail associated therewith and indicative of relationship information provided by a user, can be assigned with a certain numeric value (e.g. a default numeric value) as described with reference to block 620 herein, whereas a weighting function (e.g. a rule-based weighting function) can increase (or decrease in case of lack of relationship) the weights within cells associated with metadata details indicative of relationship information provided by a user (as detailed with reference to block 630 herein).

It is to be noted, with reference to FIG. 7, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Attention is now drawn to FIG. 8, showing a flowchart illustrating one example of a sequence of operations carried out for ranking data items and clusters, in accordance with the presently disclosed subject matter.

Ranking process 800 (performed e.g. by utilizing data builder module 110) can start, for example, during execution of the clustering process 600, upon manual initiation by a user, every pre-determined or calculated time period, etc. (block 810). During the ranking process 800, system 100 can be configured to calculate a rank for each data item associated with every cluster (block 820). In some cases, the rank is calculated based on a ranking function. Such ranking function can be based on the data item value and/or on one or more of the metadata details associated with it, such as its source, its owner, the data in which it was received, or any other metadata). For example, a data item that was received from a non-reliable source (e.g., in case of contacts, Facebook), can get a lower grade in comparison to a data item that is received from a more reliable source (e.g., in case of contacts, the user's cellular phone). Another example is that a data item owned by the user that is logged in to the system 100 can get a higher grade in comparison to a data item that is owned by another user that shared the data item with the logged on user. Yet another example, a data item that is received at a later date in comparison to another data item can get a higher grade than the other data item.

It is to be noted that the examples above are non-limiting. In addition, the ranking function can be based on more than one parameter (e.g. metadata items and/or data item values, etc.).

Following the ranking of the data items, the calculated ranks are stored in the data repository 150 (block 830). In addition, a rank can be calculated for each cluster, for example by aggregating the ranks of the data items associated therewith (block 840). Following the ranking of the clusters, the calculated ranks are stored in the data repository 150 (block 850).

It can be appreciated that the ranks can be used to enable providing the user with data items according to their relevancy. For example, in the context of contacts, there could be situations in which conflicting data items are received from various sources. For example, a certain contact person can be associated with more than one address, received from more than one source. It can be further appreciated that, for example, some sources can be less reliable than others and thus, the addresses that are received from such sources should be ranked below the addresses that are received from relatively reliable sources. Ranking the conflicting data items can enable providing the user with data items ranked in accordance with the calculated rank. For example, the conflicting data items can be presented to the user ordered from the highest ranked conflicting data items to the lowest ranked ones.

In case of conflicting clusters, the ranking can also enable presenting the user with such clusters in accordance with their rank. Assuming, in the context of contacts, that more than one cluster relating to a certain personal contact is created by the clustering process 600 (e.g. there are two contacts with a first name 'Joe' that do not have a surname, and thus two clusters are created for both 'Joes'), system 100 can utilize the calculated ranks in order to present the user with the clusters ordered from the highest ranked clusters to the lowest ranked ones.

It is to be noted, with reference to FIG. 8, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Turning to FIG. 9, there is shown a flowchart illustrating one example of a sequence of operations carried out for sharing data between users of the system, in accordance with the presently disclosed subject matter.

In some cases, system 100 can enable a user to share data (e.g. data items, clusters, meta clusters). A user can choose to share data with one or more other users of his choice. Alternatively or additionally, a user can share data with a public list. A public list is a group of data items and/or clusters that is accessible to users according to permissions (that can be managed, for example, by the user that created the list).

The sharing process 900 (performed e.g. by utilizing sharing management module 125) begins when a certain user chooses to share certain data (e.g. one or more data items and/or clusters and/or meta clusters) (block 905). In some cases, the user can choose to share all of the data that is associated with him (e.g. all of the data items, clusters and meta clusters that he has). In some cases, the user can be required to provide an indication as to what data he wishes to share (block 910).

The user can then select who is the share target (i.e. who to share the data with, e.g. one or more users, a public list, etc.) (block 915), and a share request, indicating that the user is interested in sharing data with the share target, is sent to the selected share target (block 920).

System 100 can be configured to check if the share target is a public list or one or more users (block 925). If the share target is one or more user, system 100 can be configured to check if the one or more users accept the share (e.g. by providing such users with a request to authorize receiving the share) (block 930).

In some cases, if the share target does not accept the share, system 100 can be configured to update the user accordingly (block 935). If however, the share target does accept the share, the shared data can be sent to the share target (block 940) and system 100 can be configured to activate process 500 described with reference to FIG. 5 herein (block 945).

In some cases, system 100 can be configured to provide the share target with a suggestion to share data with the user that initiated the share (block 950). In case the share target agrees to share data with the user that initiated the share, system 100 can be configured to save the sharing definition in data repository 150 (in some cases, the sharing definition can be used in order to enable updating the share targets with any change of the shared data performed at later stages in order to enable updating the data accordingly for the share target) (block 960) and to activate process 500 described with reference to FIG. 5 herein over the data that the share target chose to share with the user that initiated the share (block 965).

In case the share target does not agree to share data with the user that initiated the share, system 100 can be configured to save the sharing definition in data repository 150 (in some cases, the sharing definition can be used in order to enable updating the share targets with any change of the shared data performed at later stages in order to enable updating the data accordingly for the share target) (block 970).

In case the share target is a public list, system 100 can be configured to check if the user has permission to share with the selected public list (block 975). In some cases, if the user does not have permission to share with the selected public list (the share target), system 100 can be configured to update the user accordingly (block 935). If however, the user does have permission to share with the selected public list (the share target), the shared data can be sent to the share target (block 940) and system 100 can be configured to activate process 500 described with reference to FIG. 5 herein (block 985).

In some cases, system 100 can be further configured to check if the user has permission to read data from the selected public list (block 990). If not—system 100 can be configured to store the sharing definition in data repository 150 (in some cases, the sharing definition can be used in order to enable updating the share targets with any change of the shared data performed at later stages in order to enable updating the data accordingly for the share target) (block 970). If yes—system 100 can be configured to save the sharing definition in data repository 150 (in some cases, the sharing definition can be used in order to enable updating the share targets with any change of the shared data performed at later stages in order to enable updating the data accordingly for the share target) (block 960) and to activate process 500 described with reference to FIG. 5 herein over the data that associated with the selected public list (block 965).

It is to be noted that the original ownership metadata detail is maintained also when data items associated with the ownership metadata detail are shared with other users/public lists. This enables, inter alia, a user that chose to share certain data to cancel the share and remove the shared data shared with the share target.

It is to be noted, with reference to FIG. 9, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

Figure 10:
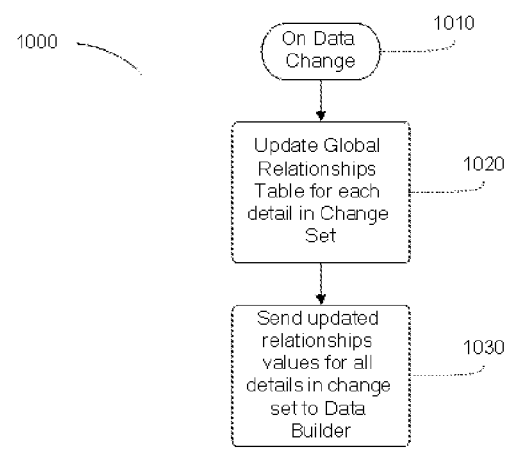
FIG. 10 is a flowchart illustrating one example of a sequence of operations carried out for maintaining a global relationships table and associating data items with additional metadata, in accordance with the presently disclosed subject matter.

Attention is drawn to FIG. 10 showing a flowchart illustrating one example of a sequence of operations carried out for maintaining a global relationships table and associating data items with additional metadata, in accordance with the presently disclosed subject matter.

In some cases, system 100 can be configured to maintain a global relationships table. Such a table can include information on relationships between various values of various data items, as determined by the clustering process 600, irrespective of the data items owner. Thus, for each data item relating to a certain cluster, an indication about its relationship with each of the data items relating to such cluster will be maintained in the global relationships table. Assuming, for example, that a certain cluster comprising three data items, having the values 'A', 'B' and 'C' respectively, is created, an indication of a relationship between the value 'A' and the value 'B', between the value 'A' and the value 'C', between the value 'B' and the value 'C' and between the value 'A' and the value 'C' is introduced into the global relationships table.

It is to be noted that in some cases additional clusters can comprise data items having similar values to values already stored within the global relationships table. Thus, in some cases, for each relationship, a counter (or other indicator) can be maintained indicating how many occurrences of such a relationship exists. In some cases such counter can be utilized during the clustering process 600 as further detailed below.

In some cases, the global relationship management process 1000 (performed e.g. by utilizing global analytics module 140) can begin by receiving data about new and/or updated clusters (block 1010). Upon receipt of the data items relating to the new and/or updated cluster, system 100 can be configured to update the global relationships table accordingly (block 1020). Thus, if a new cluster is detected, system 100 can be configured to introduce data indicative of the relationships between the various values of the various data items comprising the cluster, into the global relationships table. If a certain cluster is updated, system 100 can be configured to introduce only relationships relating to the changes (e.g. new and/or updated data items) into the global relationships table.

In some cases, system 100 can be further configured to scan the global relationships table for any existing relationship data indicative of a relationship between one or more values of new and/or updated data items relating to the new and/or updated cluster and between other values. In case such relationships are found, system 100 can be configured to check if the other value exists in the data matrix relating to the user. If so—system 100 can be configured to associate each data item to which the relationship data related, with a metadata detail indicative of the value to which its value is related, and to trigger execution of the clustering process while taking into account any new metadata details introduced at this stage (block 1030). In some cases, the weight (indicative of the strength) assigned to the relationship between the data item and the metadata detail that is newly associated therewith can be dependent on the counter (or other indicator) described above. If the other value does not exist in the data matrix relating to the user, the system 100 ignores the relationship information relating to it.

It is to be noted, with reference to FIG. 10, that some of the blocks can be integrated into a consolidated block or can be broken down to a few blocks and/or other blocks may be added. Furthermore, in some cases, the blocks can be performed in a different order than described herein. It should also be noted that whilst the flow diagrams are described also with reference to the system elements that realize them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A computer-implemented method for dynamically clustering data items, the method comprising:
receiving (a) a plurality of data items originating from at least two sources; (b) a plurality of distinct metadata details; (c) data indicative of associations between said data items and said metadata details, wherein each data item is associated with at least one metadata detail, and wherein at least a first data item originating from a first source and a second data item originating from a second source are related data items associated with at least one shared metadata detail;
grading strengths of relationships between at least one of said data items and at least one of said metadata details; and
clustering said data items into one or more clusters, based on the calculated grades wherein at least one of said clusters comprises related data items originating from more than one source,
wherein said grading comprises applying weighting functions and the weighting functions are rule-based weighting functions.

2. The method of claim 1, further comprising enabling sharing of at least one of said clusters with at least one other user or public list.

3. The method of claim 2, further comprising receiving at least one additional data item relating to at least one of said clusters from said user or said public list.

4. The method of claim 1 wherein said clustering is based on a heuristic clustering algorithm.

5. The method of claim 1, further comprising associating at least one data item with at least one additional metadata detail by utilizing information stored in a global relationships table, and wherein said grading is performed also for the at least one additional metadata detail.

6. The method of claim 1, further comprising ranking said data items within said clusters in accordance with the relevance of said data items.

7. The method of claim 1 wherein said first data item is further associated with at least one metadata detail not associated with said second data item.

8. A method for dynamically clustering data items, the method comprising:
   receiving (a) a plurality of data items originating from at least two sources; (b) a plurality of distinct metadata details; (c) data indicative of associations between said data items and said metadata details, wherein each data item is associated with at least one metadata detail, and wherein at least a first data item originating from a first source and a second data item originating from a second source are related data items associated with at least one shared metadata detail;
   grading strengths of relationships between at least one of said data items and at least one of said metadata details;
   clustering said data items into one or more clusters, based on the calculated grades wherein at least one of said clusters comprises related data items originating from more than one source;
   clustering said one or more clusters into meta clusters; and
   ranking said clusters within said meta-clusters in accordance with the relevance of said clusters.

9. The method of claim 8, further comprising enabling sharing of at least one of said meta clusters with at least one other user or public list.

10. A system for dynamically clustering data items, the system comprising at least one processing unit configured to:
    receive (a) a plurality of data items originating from at least two sources; (b) a plurality of distinct metadata details; (c) data indicative of associations between said data items and said metadata details, wherein each data item is associated with at least one metadata detail, and wherein at least a first data item originating from a first source and a second data item originating from a second source are related data items associated with at least one shared metadata detail;
    grade strengths of relationships between at least one of said data items and at least one of said metadata details; and
    cluster said data items into one or more clusters, based on the calculated grade wherein at least one of said clusters comprises related data items originating from more than one source,
    wherein said grade comprises applying weighting functions, and the weighting functions are rule-based weighting functions.

11. The system of claim 10, wherein said processing unit is further configured to enable sharing of at least one of said clusters with at least one other user or public list.

12. The system of claim 11, wherein said processing unit is further configured to receive at least one additional data item relating to at least one of said clusters from said user or said public list.

13. The system of claim 10 wherein said clustering is based on a heuristic clustering algorithm.

14. The system of claim 10, wherein said processing unit is further configured to associate at least one data item with at least one additional metadata detail by utilizing information stored in a global relationships table, and wherein said grade is performed also for the at least one additional metadata detail.

15. The system of claim 10, wherein said processing unit is further configured to rank said data items within said clusters in accordance with the relevance of said data items.

16. The system of claim 10, wherein said first data item is further associated with at least one metadata detail not associated with said second data item.

17. A system for dynamically clustering data items, the system comprising at least one processing unit configured to:
    receive (a) a plurality of data items originating from at least two sources; (b) a plurality of distinct metadata details; (c) data indicative of associations between said data items and said metadata details, wherein each data item is associated with at least one metadata detail, and wherein at least a first data item originating from a first source and a second data item originating from a second source are related data items associated with at least one shared metadata detail;
    grade strengths of relationships between at least one of said data items and at least one of said metadata details;
    cluster said data items into one or more clusters, based on the calculated grade wherein at least one of said clusters comprises related data items originating from more than one source;
    cluster said one or more clusters into meta clusters; and
    rank said clusters within said meta-clusters in accordance with the relevance of said clusters.

18. The system of claim 17, wherein said processing unit is further configured to enable sharing of at least one of said meta clusters with at least one other user or public list.

* * * * *